(12) United States Patent
Tanaka et al.

(10) Patent No.: US 6,212,336 B1
(45) Date of Patent: *Apr. 3, 2001

(54) MULTIPLE EXPOSURE CAMERA

(75) Inventors: Yoshiharu Tanaka, Kawachinagano; Shoichi Minato, Sakai; Shigeto Ohmori; Tatsuya Suzuki, both of Kawachinagano; Junichi Tanii, Izumi, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,322

(22) Filed: Mar. 16, 1999

(30) Foreign Application Priority Data

Mar. 19, 1998 (JP) .................................................. 10-069754

(51) Int. Cl.$^7$ ........................................................ G03B 7/00
(52) U.S. Cl. .................................................................. 396/213
(58) Field of Search ....................................... 396/213, 391, 396/48, 245, 257, 258, 259, 260, 261, 262

(56) References Cited

U.S. PATENT DOCUMENTS 5,253,007 * 10/1993 Tokura et al. ........................ 396/213

FOREIGN PATENT DOCUMENTS

| 4-215633 | 8/1992 | (JP) . |
| 6-160933 | 6/1994 | (JP) . |

* cited by examiner

Primary Examiner—W. B. Perkey
(74) Attorney, Agent, or Firm—Morrison & Foerster LLP (57) ABSTRACT

A multiple exposure camera performing a plurality of exposures in one photographing operation has a diaphragm, a shutter and a controller. The diaphragm controls an amount of light passing through a taking optical system to reach a light receiving medium. The shutter controls an exposure time of the light receiving medium. The controller controls a degree of blur of a subject image formed on the light receiving medium by controlling an exposure operation at a predetermined aperture value and a predetermined shutter speed in each of the plurality of times of exposures.

9 Claims, 10 Drawing Sheets

MULTIPLE EXPOSURE CAMERA

This application is based on application No. H10-069754 filed in Japan, the contents of which are hereby incorporated by reference.

BACKGROUND OF THE INVENTION

1. Field of the Invention

The present Invention relates to a multiple exposure camera, and more specifically, to a multiple exposure camera performing a plurality of times of exposures on the same film surface in one release operation.

2. Description of the Prior Art

In conventional photographing, out-of-focus images become blurred. This is undesirable because the edge of the blurred image is enhanced, for example, in the case of a monotonous subject such as a light source. When the degree of blur is substantially uniform in the entire blurred image, a natural and beautiful blurred image is obtained. Means for obtaining such ideal pictures or improving the appearance of pictures include one that uses a so-called apodization effect in which the quantity of the light emanating from the subject and passing through a peripheral portion of the lens is made smaller than that of the light passing through the central portion. This has already been commercialized as a camera.

An arrangement has been disclosed for obtaining pictures where two subjects are in focus by setting a shutter speed, an aperture value, a focal length and in-focus lens driving for a first subject, setting a shutter speed, an aperture value, a focal length and in-focus lens driving for a second subject at a longer distance than the first subject, and performing multiple exposure as described in Japanese Laid-open Patent Application No. H4-215633.

Moreover, the present applicant has disclosed an arrangement in which for a first subject and a second subject at different distances in the photographic image plane, an aperture value where at least one of the subjects is situated outside the depth of field and an aperture value where both are situated within the depth of field are decided and multiple exposure is performed at each of the aperture values as described in Japanese Laid-open Patent Application No. H6-160933.

However, in the conventional product using the apodization effect, the aperture diameter of the diaphragm varies at a constant speed, so that it is impossible to arbitrarily set the apodization effect. Moreover, in the arrangement as described in Japanese Laid-open Patent Application No. H4-215633, an object thereof is to obtain pictures in which subjects at different distances are in focus, which is different from the object of the present invention, i.e. to obtain natural and beautiful blurred images. Moreover, the arrangement as described in Japanese Laid-open Patent Application No. H6-160933 merely provides pictures in which a single blurred image is superimposed outside an in-focus image.

SUMMARY OF THE INVENTION

An object of the present invention is to provide a multiple exposure camera in which natural and beautiful blurred images are obtained by using the so-called apodization effect in a camera of a normal arrangement in which a diaphragm mechanism is set at a predetermined aperture value before exposure is started, a shutter mechanism operates with the aperture diameter being fixed and the aperture value does not vary during exposure.

To achieve the above-mentioned object, according to the present invention, a multiple exposure camera performing a plurality of times of exposures on the same film surface in one release operation is provided with exposure means for performing an exposure operation by controlling a diaphragm and a shutter and control means for performing the exposure operation by the exposure means at a predetermined aperture value and a predetermined shutter speed in each of the plurality of times of exposures.

The aperture value includes an aperture value set by the user, an open aperture value, a value in minimum aperture state (hereinafter, referred to as minimum aperture value) and an aperture value decided based on a maximum shutter speed and a predetermined exposure amount.

The aperture value in each exposure is set so as to have a predetermined ratio to an immediately preceding aperture value. Or, the aperture value in each exposure is set so as to have a predetermined difference from the immediately preceding aperture value.

The shutter speed is controlled so that the exposure amount in each exposure is the same. Or, the shutter speed is controlled so that the exposure amount increases as the aperture value in each exposure decreases. Or, the shutter speed is controlled so that the exposure amount decreases as the aperture value in each exposure decreases.

The aperture value in each exposure is set with reference to the open aperture value or the minimum aperture value. The shutter speed in each exposure is set with reference to the maximum shutter speed.

The plurality of times of exposures are performed in the order of decreasing exposure amount. The number of the plurality of times of exposures is at least three.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
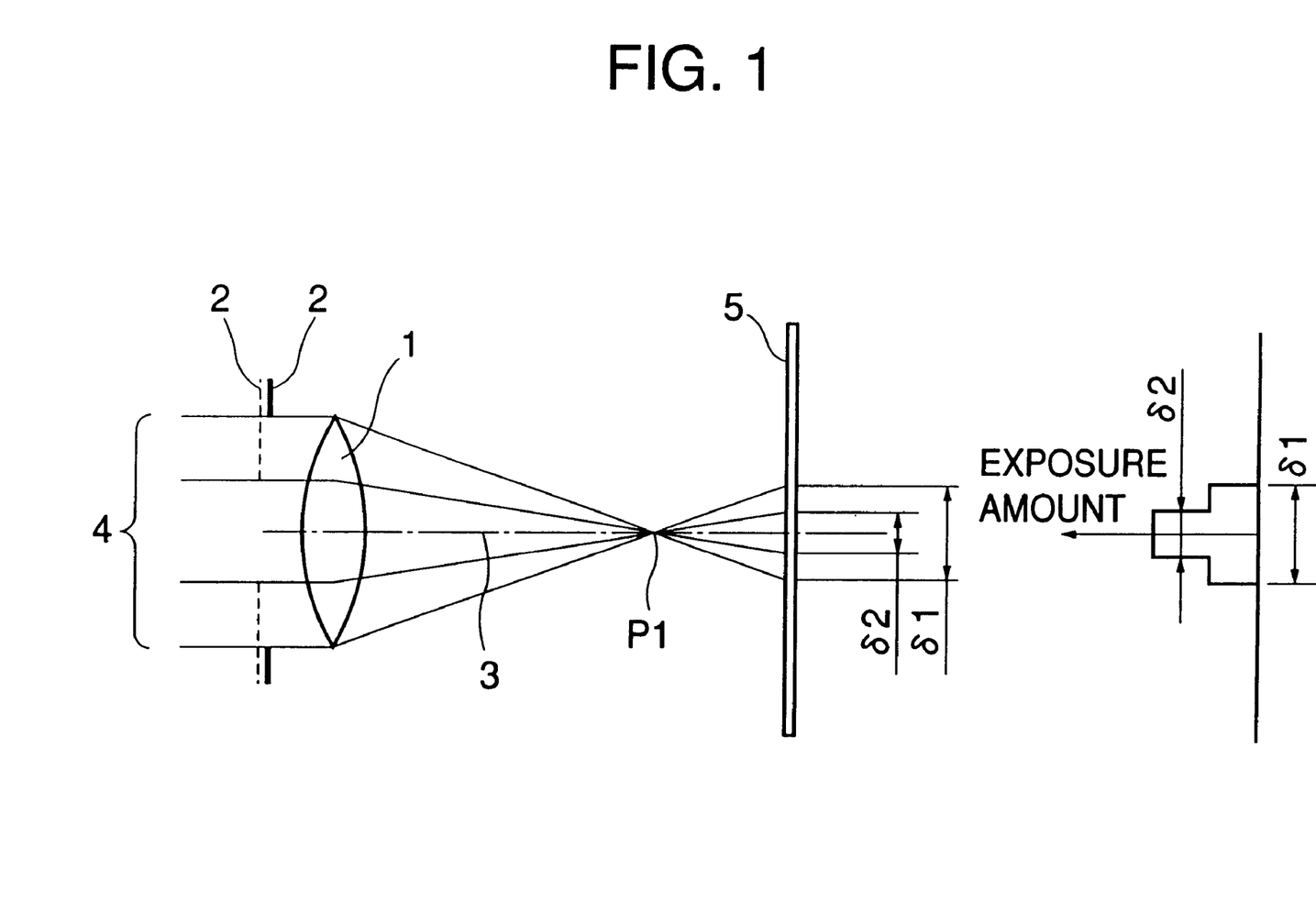
FIG. 1 is a longitudinal cross-sectional view schematically showing an optical system showing a principle of the present invention.

Hereinafter, embodiments of the present invention will be described with reference to the drawings. FIG. 1 is a longitudinal cross-sectional view schematically showing an optical system showing a principle of the present invention. Reference numeral 1 represents a taking lens. Reference numeral 2 represents a diaphragm disposed in the front (on the subject side) of the taking lens 1. The solid line represents the open aperture state. The broken line represents the minimum aperture state. Reference numeral 3 represents the optical axis which is shown by a dash and dotted line. Reference numeral 4 represents a luminous flux from a non-illustrated background subject. Reference numeral 5 represents a film surface disposed at the focal point position of a non-illustrated main subject. On the right side of the figure, a graph is provided showing the relationship between the exposure amount and the diameter of a circle of confusion, that is, the image of the blurred image.

As shown in the figure, the luminous flux 4 from the background subject passes through the diaphragm 2 in the open aperture state shown by the solid line to be transmitted by the taking lens 1 and is imaged at a point P1 ahead of the film surface 5 to form a blurred image with a circle of confusion on the film surface 5. We let the diameter of the circle of confusion in the open aperture state at this time be δ1. Likewise, the luminous flux 4 from the background subject passes a through the diaphragm 2 in the minimum aperture state shown by the broken line to be transmitted by the taking lens 1 and is imaged at the point P1 ahead of the film surface 5 to form a blurred image with a circle of confusion on the film surface 5. We let the diameter of the circle of confusion in the minimum aperture state at this time be δ2.

In this case, by superimposing blurred images having the confusion circle diameters δ1 and δ2 by multiple exposure, the exposure amounts are combined as shown in the graph on the right side, so that an effect, for example, that the edge of the blurred image becomes gentle is produced and the degree of blur can be adjusted. By varying the aperture diameter of the diaphragm 2, the confusion circle diameter can be arbitrarily set between δ2 and δ1, so that the so-called apodization effect can arbitrarily be obtained.

Figure 2:
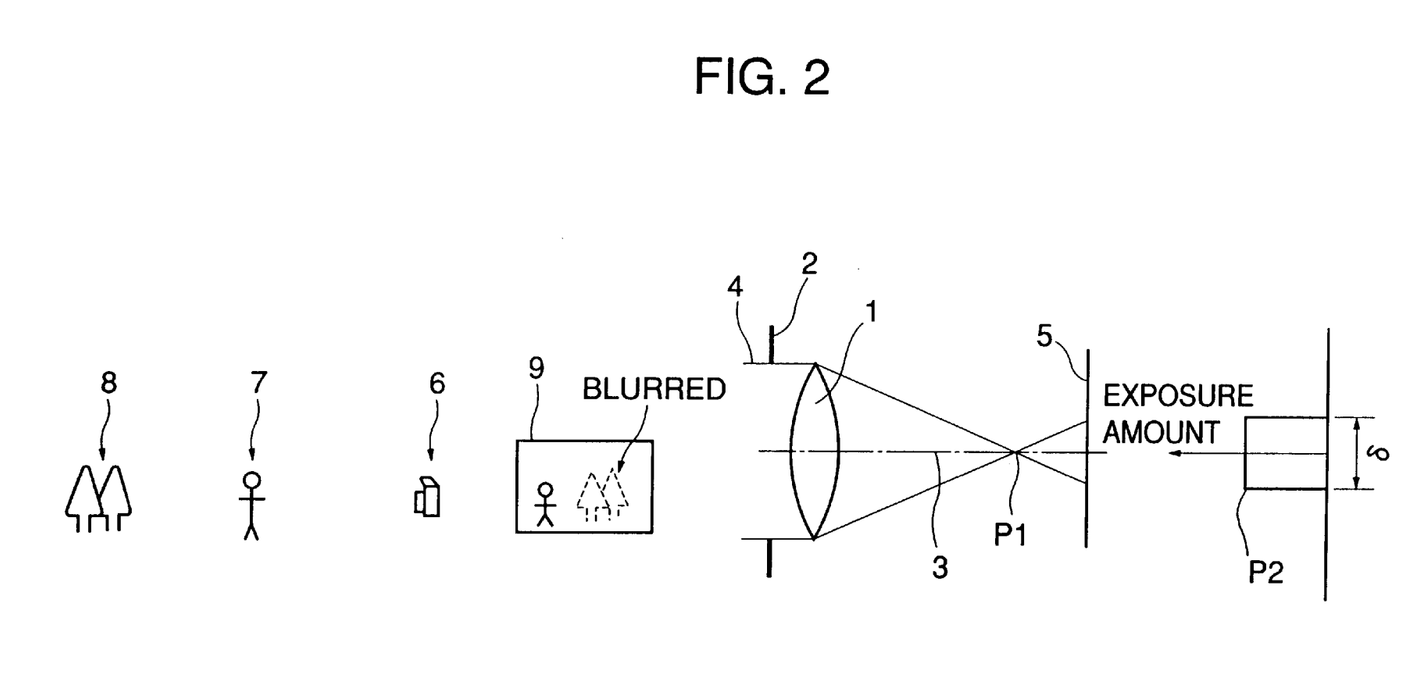
FIG. 2 is a view schematically showing normal photographing condition in which multiple exposure is not performed.

FIG. 2 is a view schematically showing normal photographing condition where multiple exposure is not performed. Reference numeral 6 represents a camera disposed for photographing. Reference numeral 7 represents a person which is the main subject. Reference numeral 8 represents a tree which is the background subject. Reference numeral 9 represents a film image exposed by photographing. On the right side thereof, an optical system in this photographing condition is schematically shown in a longitudinal cross-sectional view. On the most right side, a graph is provided showing the relationship between the exposure amount and the diameter of the circle of confusion, that is, the image of the blurred image.

As shown in the figure, when the person 7 is photographed by the camera 6 with the tree 8 in the background, if the image of the person 7 appearing in the film image 9 is in focus, the image of the tree 8 is blurred. At this time, the luminous flux 4 from the tree 8 passes through the diaphragm 2 in the optical system to be transmitted by the taking lens 1 and is imaged at the point P1 ahead of the film surface 5 to form a blurred image with a circle of confusion on the film surface 5. When the diameter of the circle of confusion at this time is δ, the relationship with the exposure amount is as shown in the graph on the right end and a picture in which the edge represented by a point P2 is enhanced is obtained. This is undesirable.

As a familiar example, although not directly related to the present invention, in television, when shooting is performed against the sun in a program, the hexagonal configuration of the aperture of the TV camera appears on the TV screen and a blurred image of the sunlight being sharp on the periphery is generated, so that the image is very difficult to view. Therefore, in taking pictures, the degree of blur of blurred images is adjusted by performing multiple exposure in embodiments as shown below.

Figure 3A:
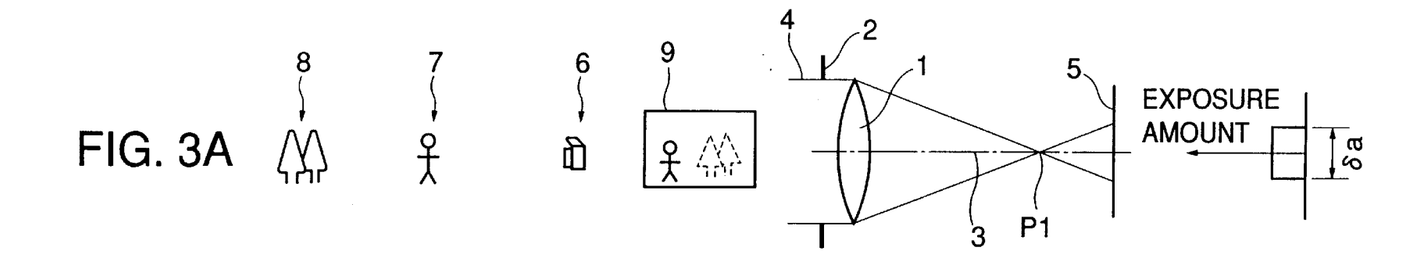
FIGS. 3A to 3D are views schematically showing photographing conditions in multiple exposure in a first embodiment of the present invention.
Figure 3B:
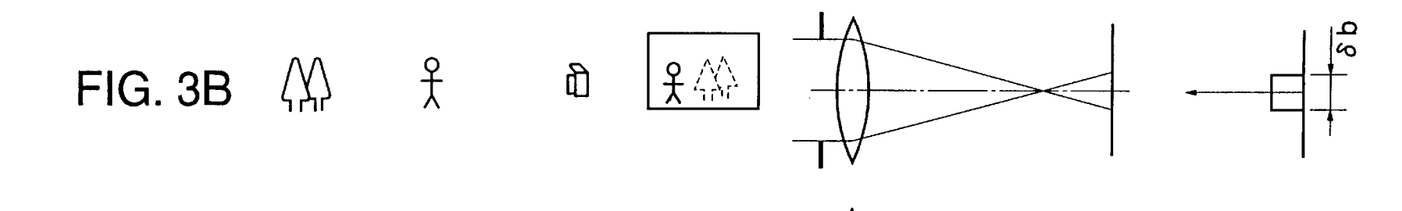
Figure 3C:
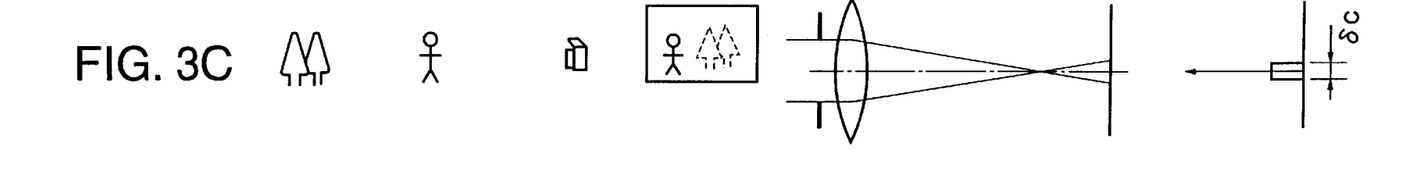

FIGS. 3A to 3D are views schematically showing photographing conditions in multiple exposure in a first embodiment of the present invention. FIGS. 3A, 3B and 3C each show an exposure condition in one exposure of multiple exposure. That is, in this case, an example of multiple exposure in which exposure is performed three times is given. While exposure is performed three times also in the other embodiments shown below, the present invention does not stick to this; the necessary number of exposures can be set as far as possible.

As shown in the figures, like in FIG. 2, when the person 7 is photographed by the camera 6 with the tree 8 in the background, if the image of the person 7 appearing in the film image 9 is in focus, the image of the tree 8 is blurred. At this time, the luminous flux 4 from the tree 8 passes through the diaphragm 2 in the optical system to be transmitted by the taking lens 1 and is imaged at the point P1 ahead of the film surface 5 to form a blurred image with a circle of confusion on the film surface 5.

Figure 3D:
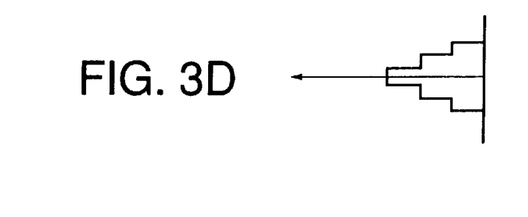

In FIGS. 3A to 3C, since the diaphragm 2 is stopped down in the order of FIG. 3A, 3B and 3C, when the confusion circle diameters in FIG. 3A, 3B and 3C are δa, δb and δc, respectively, the relationships between the exposure amounts and the confusion circle diameters, that is, the images of the blurred images are as shown by the graphs on the right ends by controlling the shutter speed (SS, described later) so that the exposure amount is the same. FIG. 3D is a graph comprising a combination of the graphs of FIGS. 3A, 3B and 3C and showing the image of the blurred image after multiple exposure. In this embodiment, the exposure amount gently decreases from the inside to the outside of the blurred image.

While the aperture diameter of the diaphragm 2 is varied by a predetermined diameter difference in these figures, the aperture diameter may be varied at a predetermined diameter ratio when the degree of gentleness of the blurred image is to be changed. For example, when the variation of the aperture diameter is started from the diameter in the open aperture state and the diameter in the open aperture state is 1, the aperture diameter may be varied at a ratio such as 1, ½, ¼. . . , etc. and exposure is performed in each state.

Figure 4A:
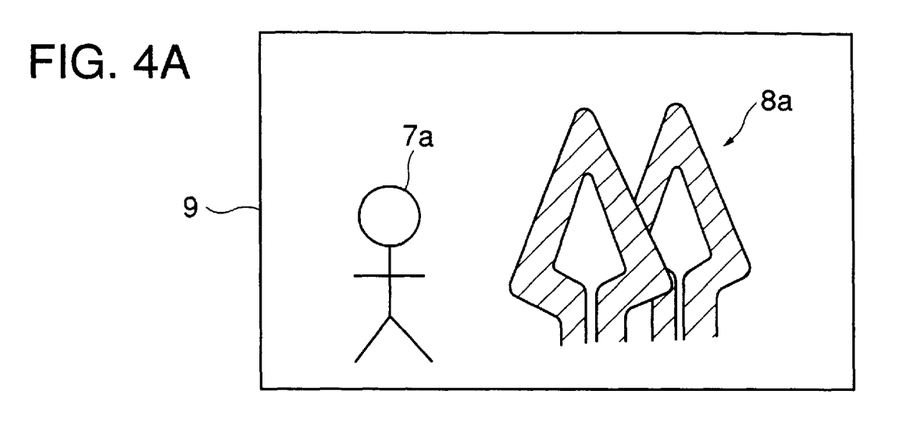
FIGS. 4A to 4C are views schematically showing film images in the first embodiment being enlarged.
Figure 4B:
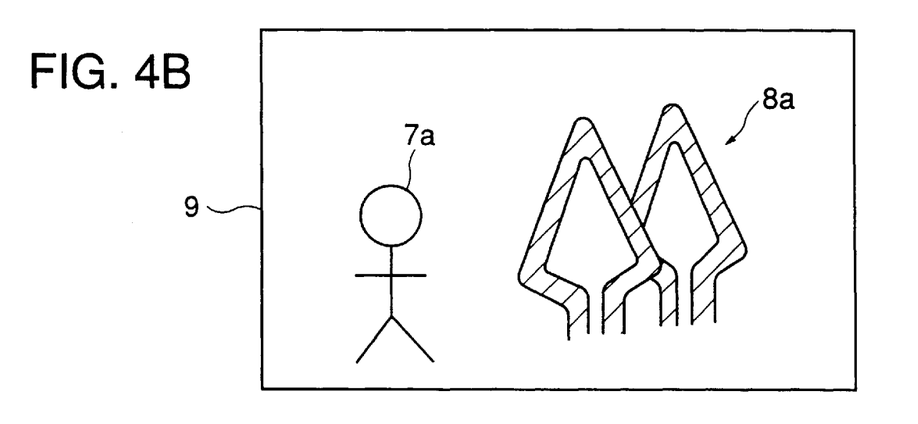
Figure 4C:
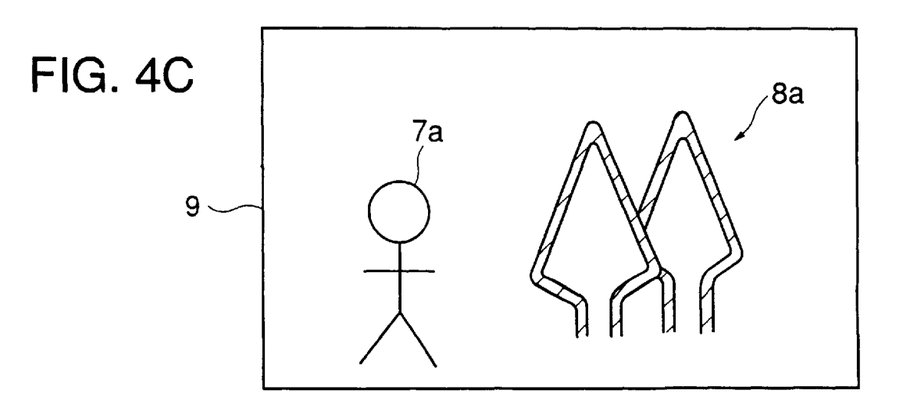

FIGS. 4A to 4C are views schematically showing the film image 9 being enlarged. FIGS. 4A, 4B and 4C correspond to FIGS. 3A, 3B and 3C, respectively. In the figures, the degree of blur of a blurred image 8a of the tree which is the background subject is represented by the width of the edge, and the exposure amount is represented by the density of the hatch. Reference numeral 7a represents an image of the person. Since the diaphragm 2 is stopped down by a predetermined diameter difference in the order of FIGS. 4A, 4B and 4C and the shutter speed (SS) is controlled so that the exposure amount is the same in each of FIGS. 4A, 4B and 4C as mentioned above, when the three images are superimposed by multiple exposure, an image is obtained in which the exposure amount varies gently from the inside to the outside.

Figure 5A:
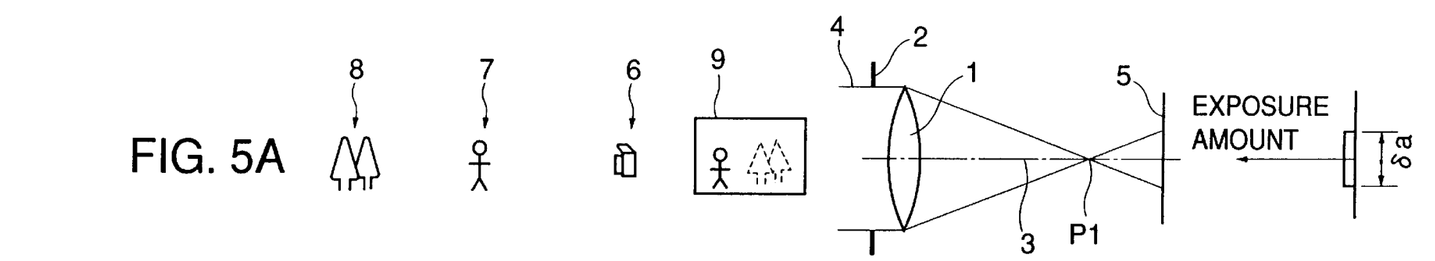
FIGS. 5A to 5D are views schematically showing photographing conditions in multiple exposure in a second embodiment of the present invention.
Figure 5B:
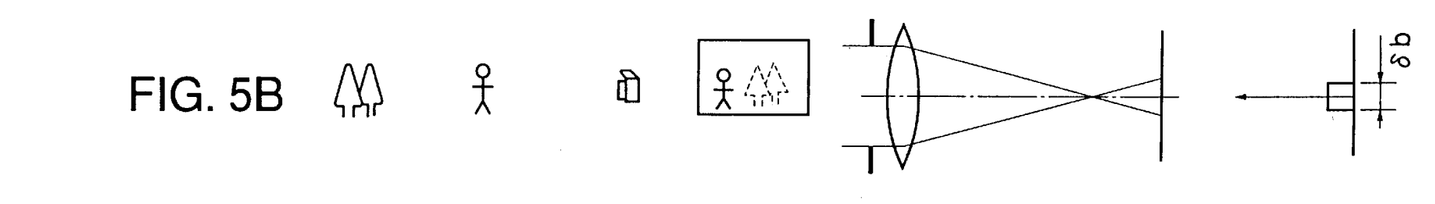
Figure 5C:
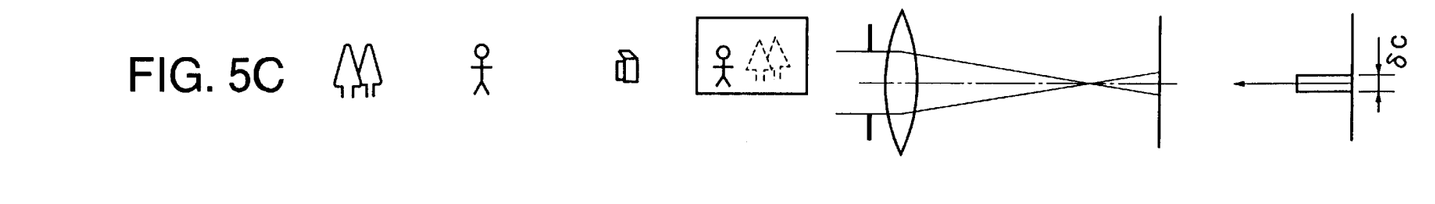

FIGS. 5A to 5D are views schematically showing photographing conditions in multiple exposure in a second embodiment of the present invention. FIGS. 5A, 5B and 5C each show an exposure condition in one exposure of multiple exposure. As shown in the figures, when the person 7 is photographed by the camera 6 with the tree 8 in the background, if the image of the person 7 appearing in the film image 9 is in focus, the image of the tree 8 is blurred. At this time, the luminous flux 4 from the tree 8 passes through the diaphragm 2 in the optical system to be transmitted by the taking lens 1 and is imaged at the point P1 ahead of the film surface 5 to form a blurred image with a circle of confusion on the film surface 5.

Figure 5D:
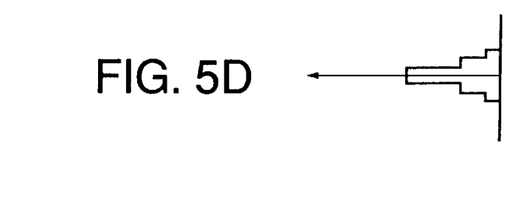

In FIGS. 5A to 5C, since the diaphragm 2 is stopped down in the order of FIGS. 5A, 5B and 5C, when the confusion circle diameters in FIGS. 5A, 5B and 5C are δa, δb and δc, respectively, the relationships between the exposure amounts and the confusion circle diameters, that is, the images of the blurred images are as shown by the graphs on the right ends by controlling the shutter speed (SS) so that the exposure amount gradually increases. FIG. 5D is a graph comprising a combination of the graphs of FIGS. 5A, 5B and 5C and showing the image of the blurred image after multiple exposure. In this embodiment, the exposure amount rapidly decreases from the inside to the outside of the blurred image, and an image with a so-called core is obtained. While the aperture diameter of the diaphragm 2 is varied by a predetermined diameter difference in the figures, when a blurred image with a more obvious core is to be formed, the aperture diameter may be varied at a predetermined diameter ratio as mentioned above.

Figure 6A:
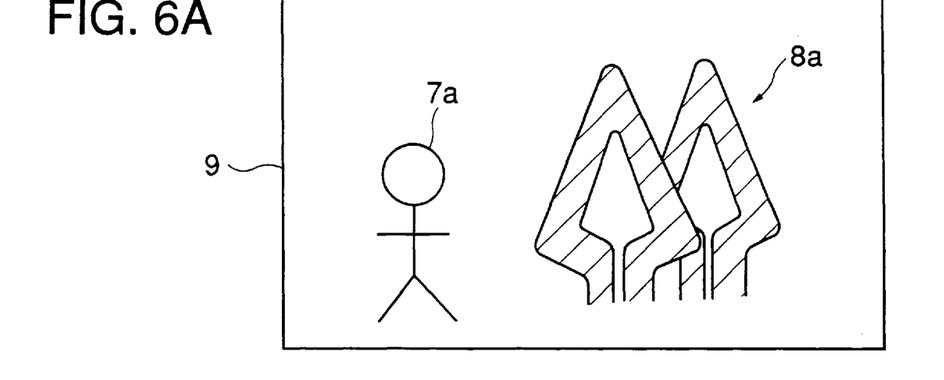
FIGS. 6A to 6C are views schematically showing film images in the second embodiment being enlarged.
Figure 6B:
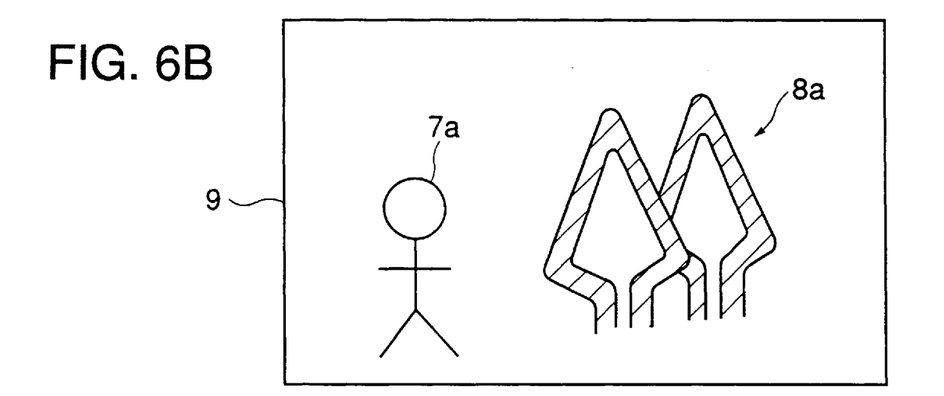
Figure 6C:
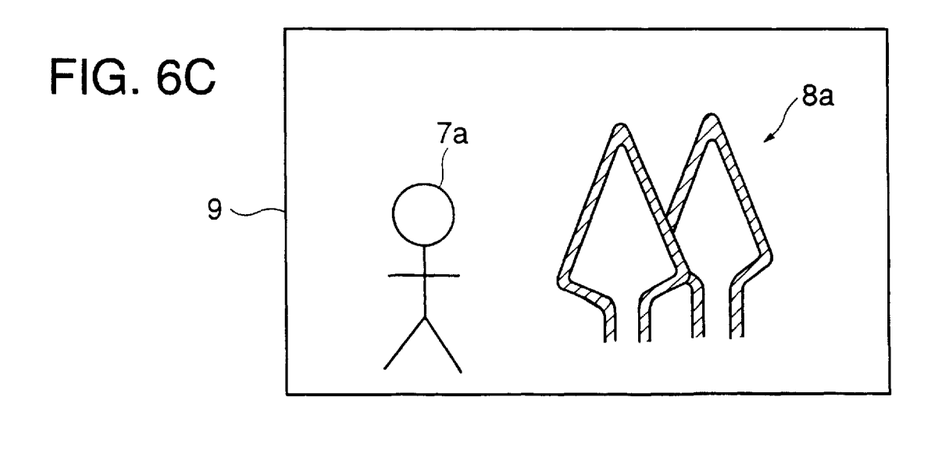

FIGS. 6A to 6C are views schematically showing the film image 9 being enlarged. FIGS. 6A, 6B and 6C correspond to FIGS. 5A, 5B and 5C, respectively. In these figures, the degree of blur of the blurred image δa of the tree which is the background subject is represented by the width of the edge, and the exposure amount is represented by the density of the hatch. Reference numeral 7a represents an image of the person. Since the diaphragm 2 is stopped down by a predetermined diameter difference in the order of FIGS. 6A, 6B and 6C and the shutter speed (SS) is controlled so that the exposure amount gradually increases in the order of FIGS. 6A, 6B and 6C as mentioned above, when the three images are superimposed by multiple exposure, the image rapidly becomes paler from the inside to the outside of the blurred image, and an image with a so-called core is obtained.

Figures 7A, 7B:
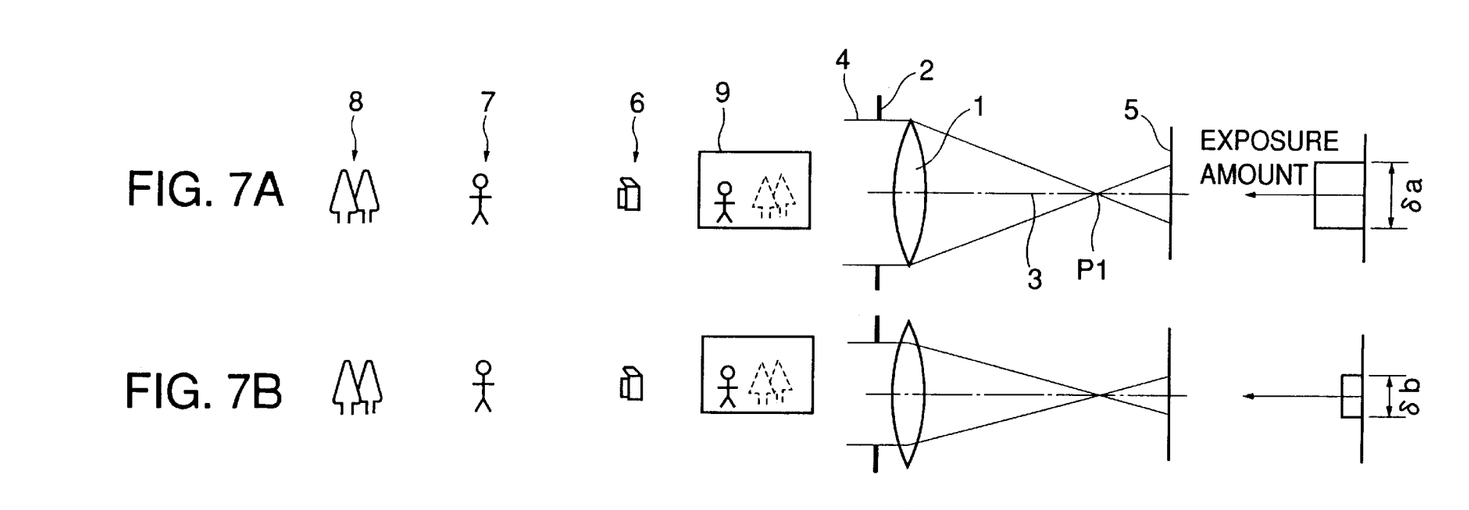
FIGS. 7A to 7D are views schematically showing photographing conditions in multiple exposure in a third embodiment of the present invention.
Figure 7C:
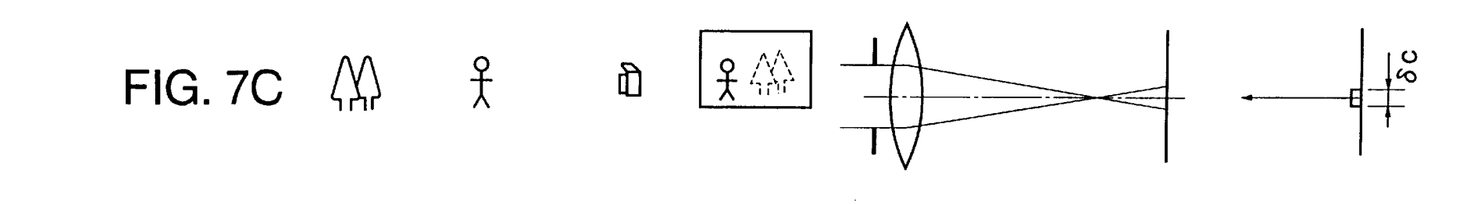

FIGS. 7A to 7D are views schematically showing photographing conditions in multiple exposure in a third embodiment of the present invention. FIGS. 7A, 7B and 7C each show an exposure condition in one exposure in multiple exposure. As shown in the figures, when the person 7 is photographed by the camera 6 with the tree 8 in the background, if the image of the person 7 appearing in the film image 9 is in focus, the image of the tree 8 is blurred. At this time, the luminous flux 4 from the tree 8 passes through the diaphragm 2 in the optical system to be transmitted by the taking lens 1 and is imaged at the point P1 ahead of the film surface 5 to form a blurred image with a circle of confusion on the film surface 5.

Figure 7D:
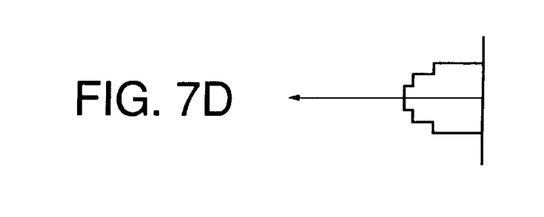

In FIGS. 7A to 7C, since the diaphragm 2 is stopped down in the order of FIGS. 7A, 7B and 7C, when the confusion circle diameters in FIGS. 7A, 7B and 7C are δa, δb and δc, respectively, the relationships between the exposure amounts and the confusion circle diameters, that is, the images of the blurred images are as shown by the graphs on the right ends by controlling the shutter speed (SS) so that the exposure amount gradually decreases. FIG. 7D is a graph comprising a combination of the graphs of FIGS. 7A, 7B and 7C and showing the image of the blurred image after multiple exposure. In this embodiment, the exposure amount decreases from the inside to the outside of the blurred image gradually at first and rapidly at the end portion, and an image in which the edge is eliminated although the so-called core is not so obvious is obtained. Consequently, pictures with enhanced edges as described in FIG. 2 can be improved.

While the aperture diameter of the diaphragm 2 is varied by a predetermined diameter difference in the figures, when a blurred image in which the edge is more eliminated is to be formed, the aperture diameter may be varied at a predetermined diameter ratio. For example, when the variation of the aperture diameter is started from the diameter in the open aperture state and the diameter in the open aperture state is 1, the aperture diameter may be varied at a ratio such as 1, 2, 4 . . . , etc. and exposure is performed in each state.

Figure 8A:
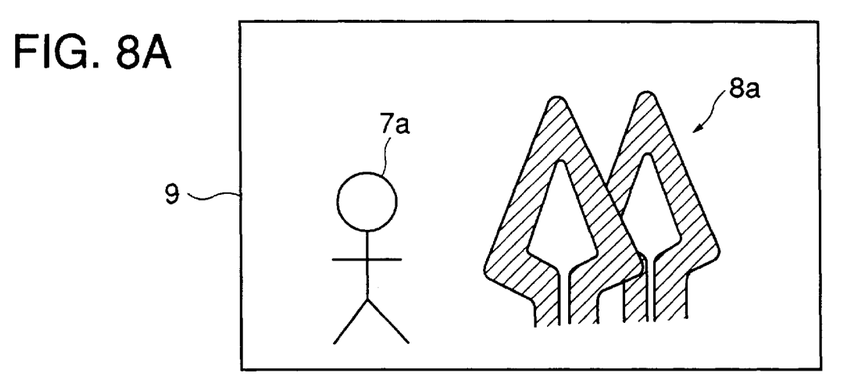
FIGS. 8A to 8C are views schematically showing film images in the third embodiment being enlarged.
Figure 8B:
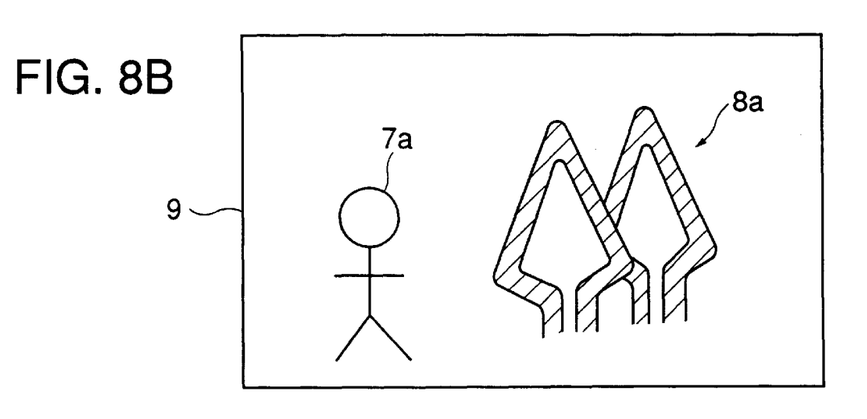
Figure 8C:
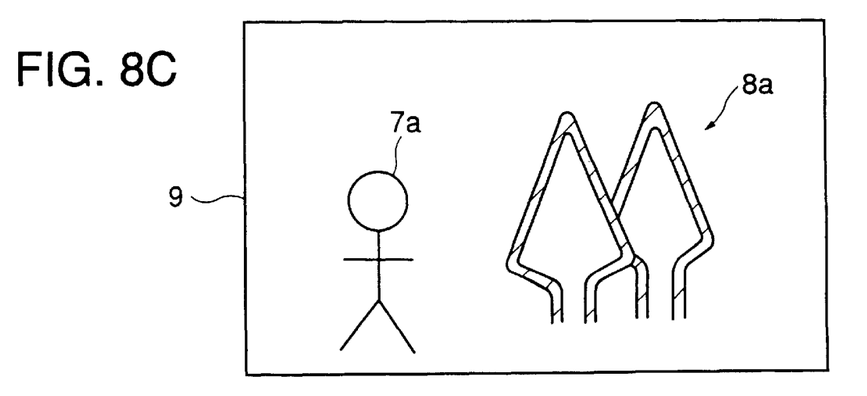

FIGS. 8A to 8C are views schematically showing the film image 9 being enlarged. FIGS. 8A, 8B and 8C correspond to FIGS. 7A, 7B and 7C, respectively. In these figures, the degree of blur of the blurred image δa of the tree which is the background subject is represented by the width of the edge, and the exposure amount is represented by the density of the hatch. Reference numeral 7a represents an image of the person. Since the diaphragm 2 is stopped down by a predetermined diameter difference in the order of FIGS. 8A, 8B and 8C and the shutter speed (SS) is controlled so that the exposure amount gradually decreases in the order of FIGS. 8A, 8B and 8C as mentioned above, when the three images are superimposed by multiple exposure, the image becomes paler from the inside to the outside of the blurred image gradually at first and rapidly at the end portion, and an image in which the edge is eliminated although the so-called core is not so obvious is obtained.

It is preferable to perform exposures in multiple exposure in the order of decreasing exposure amount. The reason therefor is that, since the moment at which the user depresses the release button is the time when the camera is most firmly held and camera shake is small, it is preferable to perform exposure as much possible at that time. Even if camera shake occurs later, the influence is small since the exposure amount is small at that time. Therefore, from that viewpoint, in FIGS. 7A to 7D and 8A to 8C showing the third embodiment, exposure is performed in the order of FIGS. 7A, 7B and 7C, whereas in FIGS. 5A to 5D and 6A to 6C showing the second embodiment, it is preferable to perform exposure in the reverse order, that is, in the order of FIGS. 5C, 5B and 5A.

Figure 9:
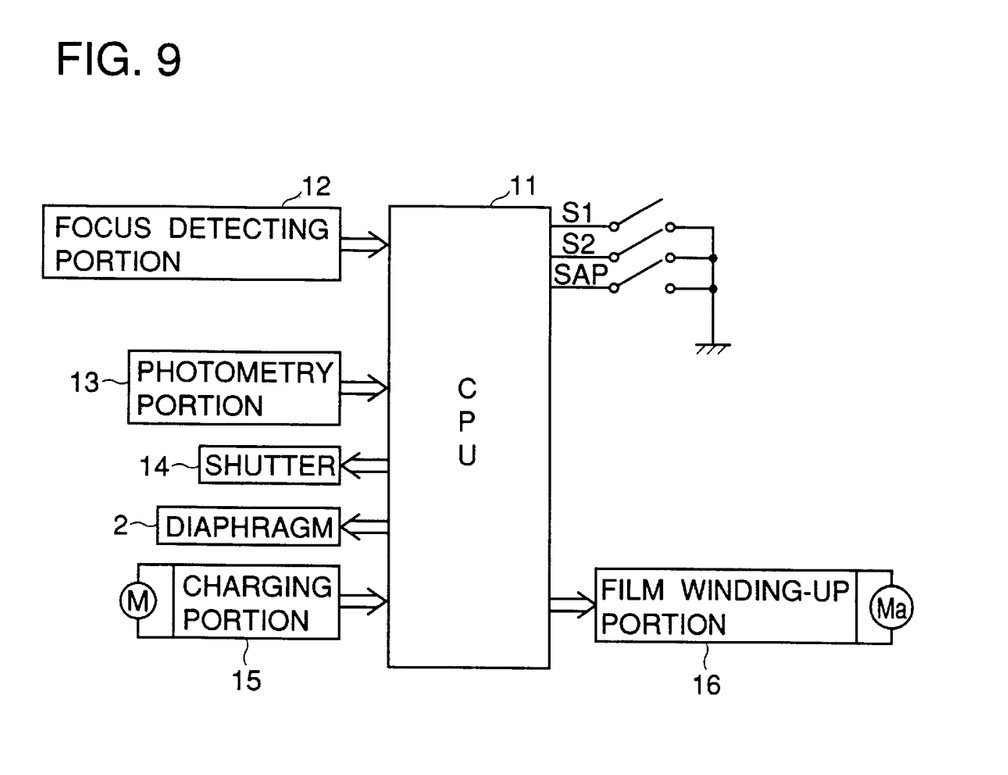
FIG. 9 is a block diagram of assistance in explaining a control system in a multiple exposure camera of the present invention.

FIG. 9 is a block diagram of assistance in explaining a control system in the multiple exposure camera of the present invention. Reference numeral 11 represents a control portion comprising, for example, a microcomputer. Reference numeral 12 represents a focus detecting portion for obtaining focus control information. Reference numeral 13 represents a photometry portion for obtaining exposure control information. Reference numeral 14 represents a shutter for exposure. Reference numeral 2 represents the diaphragm. Reference numeral 15 represents a charging portion for returning to the original states (charging) the shutter, the diaphragm and a flip-up mirror of a single-lens reflex camera (not shown), etc. so as to be in a standby state for each exposure operation by driving a motor M. Reference numeral 16 represents a film winding-up portion for winding up the film by driving a motor Ma. A common motor may be used as the motors M and Ma.

S1 represents a switch for actuating the focus detecting portion 12 and the photometry portion 13. S2 represents a switch for performing a release operation. Typically, these switches S1 and S2 are turned on by half depression and full depression of a release button (not shown), respectively. SAP represents a multiple exposure switch for performing the multiple exposure in the present invention. This switch is for setting and canceling the multiple exposure mode in the present invention by a slide switch or a toggle switch provided separately.

Figure 10:
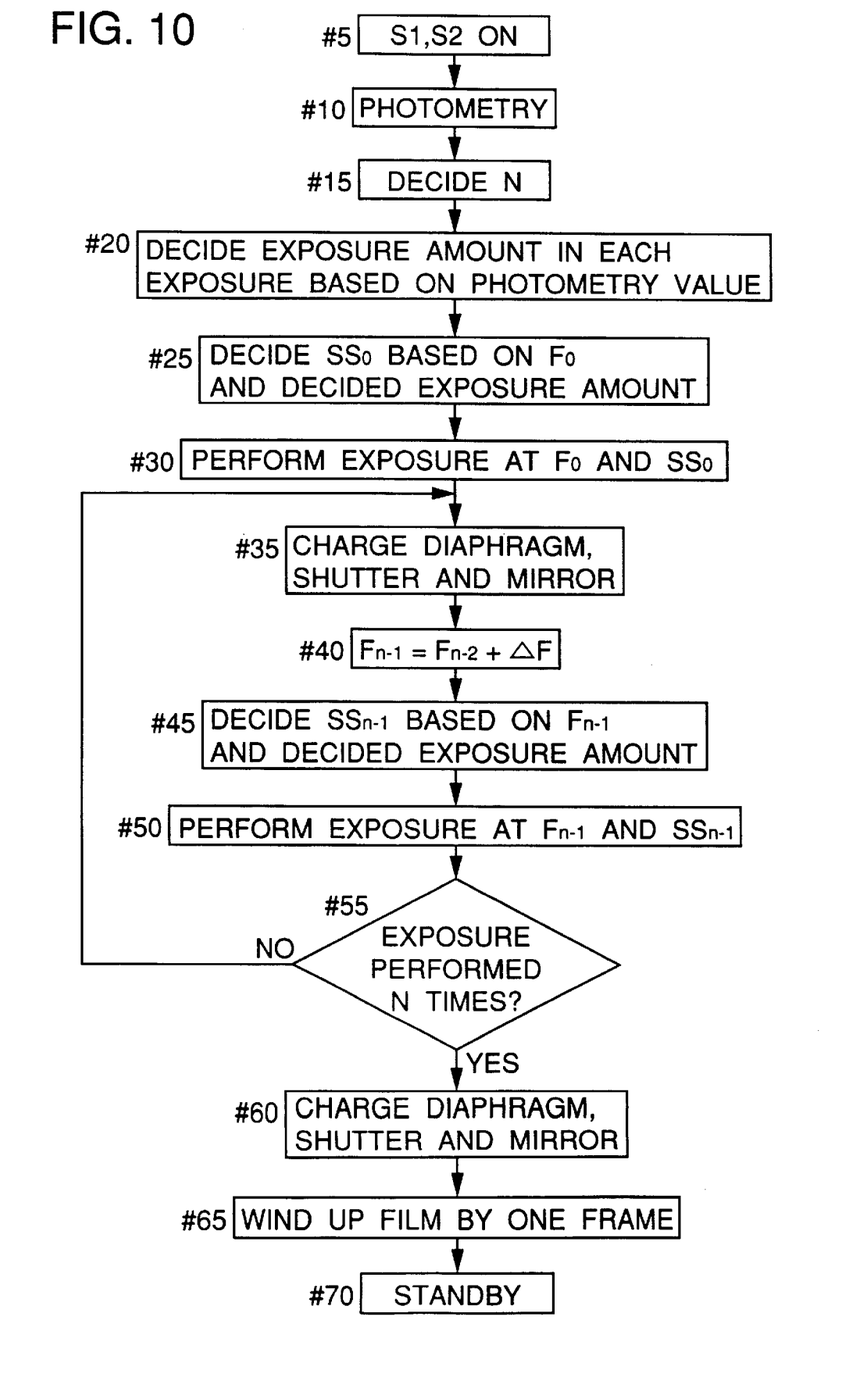
FIG. 10 is a flowchart showing a sequence to perform the multiple exposure in the present invention.

FIG. 10 is a flowchart showing a sequence to perform the multiple exposure in the present invention. In the figure, when the multiple exposure mode is set, first, the user fully depresses the non-illustrated release button at step #5, and when the switches S1 and S2 become continuously on, photometry is performed by the photometry portion 13 at step #10. Then, the number N of exposures performed in the multiple exposure is decided at step #15. The number N may be a fixed value, may be decided based on the aperture range of the taking lens, the shutter speed (that is, exposure time) range of the camera and the distance between the background subject and the main subject, etc., or may be set by the user.

Then, at step #20, the exposure amount in each exposure of the multiple exposure is decided based on the photometry value. As mentioned above, the exposure amount is the same in the first embodiment and varies among the exposures in the second and the third embodiments. It is to be noted that, in any case, the total exposure amount is set with reference to the photometry value of the main subject or the entire image plane.

Then, at step #25, when the open aperture value is FO, a shutter speed SSO is decided based on the open aperture value FO and the exposure amount decided at step #20. Or, FO may be the minimum aperture value or an aperture value set by the user. Or, letting the maximum speed of the shutter be SSO, the aperture value FO may be decided based on the shutter speed SSO and the exposure amount decided at step #20.

Or, setting may be made based on the number of exposures performed in the multiple exposure, the photometry value and the open aperture value and the minimum aperture value so that the aperture value of each exposure falls within the range between the open aperture value and the minimum aperture value. In this case, it is not always necessary for the open aperture value and the minimum aperture value to be included in the range. Then, at step #30, the first-time exposure is performed at the aperture value FO and the shutter speed SSO decided as described above. Then, at step #35, the diaphragm, the shutter and the flip-up mirror are charged, and at step #40, the aperture value for the next exposure is decided.

In the figure, the aperture value in the n-th-time exposure is represented by $F_{n-1}=F_{n-2}+\Delta F$ (n=1, 2, 3, . . . ) (the higher the aperture value is, the more the diaphragm is stopped down). Here, $\Delta F$ corresponds to a predetermined diameter difference. While in this expression, a case is assumed in which the aperture value is varied from the open side to the stopped down side as the number of exposures having been performed increases, the aperture value may be varied from the stopped down side to the open side. In that case, the expression of the aperture value is, for example, $F_{n-1}=F_{n-2}-\Delta F$(n=1, 2, 3, . . . , N). When the aperture value is varied at a predetermined diameter ratio, the expression of the aperture value can be, for example, $F_{n-1}=\alpha a F_{n-2}$. The predetermined diameter ratio $\alpha$ in this case can be set, for example, at ½ or 2.

Then, at step #45, a shutter speed $SS_{n-1}$ is decided based on the aperture value $F_{n-1}$ and the decided exposure amount. Then, at step #50, the n-th-time exposure is performed at the aperture value $F_{n-1}$ and the decided shutter speed $S_{n-1}$. Then, at step #55, it is determined whether the multiple exposure has been performed N times or not. When the multiple exposure has not been performed N times, the process returns to step #35. When it is determined at step #55 that the multiple exposure has been performed N times, the process shifts to step #60 to charge the diaphragm, the shutter and the flip-up mirror. Then, at step #65, the film is wound up by one frame and at step #70, the camera is brought into a standby state for the next photographing.

In the case where the user half depresses the release button so that only the switch SI is on at step #5, the succeeding steps are executed in a like manner and when step #25 is finished, it is determined whether the switch S2 is on or not, that is, whether the user fully depresses the release button or not. When the switch S2 is not on, the process returns to step #10 to perform photometry and the succeeding steps again. When the switch S2 is on, the process shifts to step #30 to successively execute the steps in a manner as described above.

Obviously, many modifications and variations of the present invention are possible in light of the above teachings. It is therefore to be understood that within the scope of the appended claims, the invention may be practiced other than as specifically described.

What is claimed is:

1. A multiple exposure camera performing a plurality of exposures in one photographing operation, comprising:
   a diaphragm, set at a predetermined aperture before exposure, controlling an amount of light passing through a taking optical system to reach a light receiving medium;
   a shutter, operating at a fixed aperture diameter, controlling an exposure time of said light receiving medium; and
   a controller controlling a degree of blur of a subject image formed on said light receiving medium by controlling an exposure operation at a predetermined aperture value and a predetermined shutter speed in each of said plurality of times of exposures, wherein the shutter speed is controlled so that the exposure amount is the same for each of said plurality of times of exposure and wherein the controller determines the aperture value in each exposure with reference to an aperture value in an open aperture state or in a minimum aperture state.

2. A multiple exposure camera as claimed in claim 1, wherein said aperture value is any one of a manually set aperture value, an aperture value in open aperture state, an aperture value in minimum aperture state, and an aperture value decided based on the shutter speed and a predetermined exposure value.

3. A multiple exposure camera as claimed in claim 1, wherein said controller sets the shutter speed in each exposure so that an exposure amount in each exposure is the same.

4. A multiple exposure camera as claimed in claim 1, wherein said controller sets the shutter speed in each exposure so that an exposure amount increases as an aperture diameter in each exposure decreases.

5. A multiple exposure camera as claimed in claim 1, wherein said controller sets the shutter speed in each exposure so that an exposure amount decreases as an aperture diameter in each exposure decreases.

6. A multiple exposure camera as claimed in claim 1, wherein said controller sets the shutter speed in each exposure with reference to a maximum shutter speed.

7. A multiple exposure camera as claimed in claim 1, wherein said controller performs said plurality of times of exposures in an order of decreasing exposure amount.

8. A multiple exposure camera as claimed in claim 1, wherein said controller performs at least three exposures in one photographing operation.

9. A multiple exposure camera performing a plurality of exposures in one photographing operation, comprising:

a diaphragm controlling an amount of light passing through a taking optical system to reach a light receiving medium;

a shutter controlling an exposure time of said light receiving medium; and a controller controlling a degree of blur of a subject image formed on said light receiving medium by controlling an exposure operation at a predetermined aperture value and a predetermined shutter speed in each of said plurality of times of exposures, wherein said controller makes a plurality of exposures while the taking optical system is kept in the same focused position.

* * * * *